Figure 1:
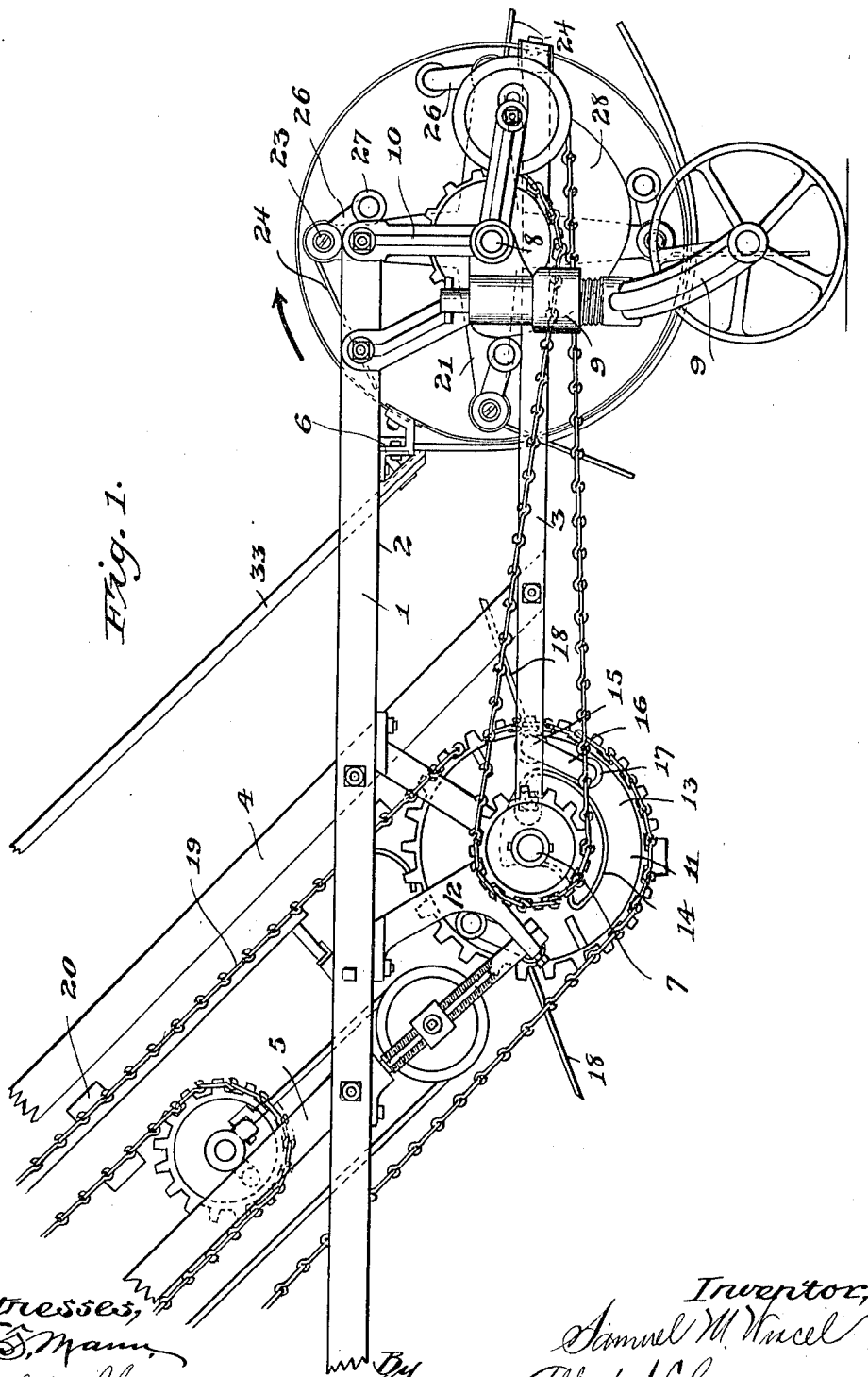

S. M. WIXCEL.
HAY LOADER.
APPLICATION FILED OCT. 1, 1906.

1,073,649.

Patented Sept. 23, 1913.

2 SHEETS—SHEET 1.

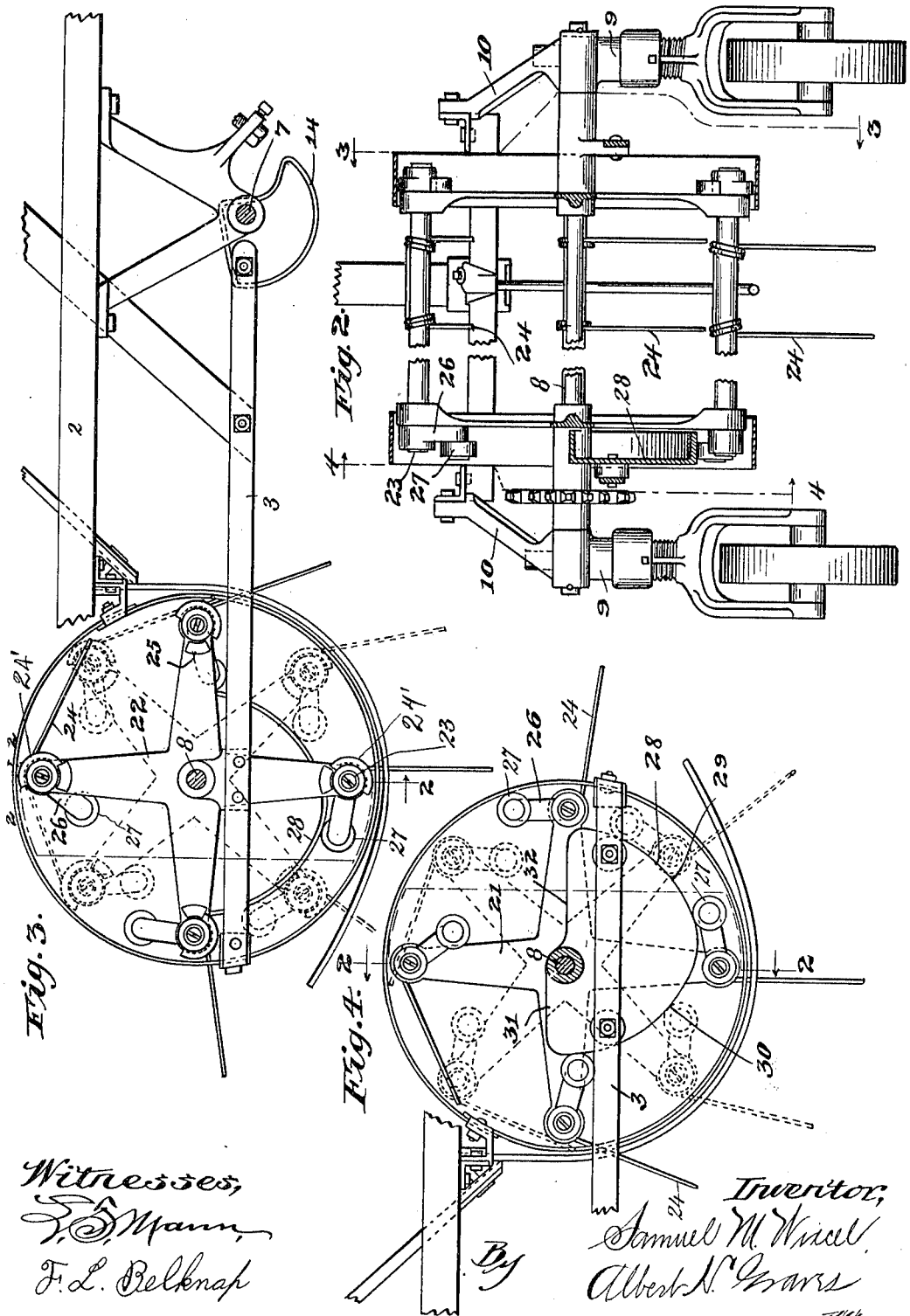

UNITED STATES PATENT OFFICE.

SAMUEL M. WIXCEL, OF SIOUX CITY, IOWA.

HAY-LOADER.

1,073,649.  Specification of Letters Patent.  Patented Sept. 23, 1913.

Application filed October 1, 1906. Serial No. 337,001.

*To all whom it may concern:*

Be it known that I, SAMUEL M. WIXCEL, a citizen of the United States, residing at Sioux City, in the county of Woodbury and State of Iowa, have invented certain new and useful Improvements in Hay-Loaders, of which the following is a specification.

This invention relates to improvements in hay loaders, and refers more specifically to improvements upon hay loaders of that type set forth in my prior Patent No. 809,598, dated January 9, 1906.

Among the salient objects of the present invention are to provide improvements in the mechanism of the rotary rake, which contribute in securing more effective and reliable operation of said rake and tend toward simplification; to provide a construction in the frame mechanism which unites the pick-up rake mechanism with the rotary rake which insures greater strength and rigidity; and in general to provide simplified and improved details of construction and arrangement in a machine of the character referred to.

The invention will be readily understood from the following description, reference being had to the accompanying drawings, in which—

Figure 1 is a general view in side elevation of the rear end portion of a loader embodying the present improvements; Fig. 2 is a view looking at the parts shown in Fig. 1 from the rear, the left-hand half of said figure being shown in section taken on line 2—2 of Fig. 4 and the right-hand half of the figure taken on line 2°—2° of Fig. 4; the central portion of the latter being broken out to reduce the width of the figure; Fig. 3 is a longitudinal vertical sectional view taken on line 3—3 of Fig. 2 and looking in the direction of the arrows; Fig. 4 is a longitudinal sectional view taken on the indirect line 4—4 of Fig. 2 and looking in the direction of the arrows.

The machine embodying my present invention is in general construction similar to a machine set forth in a prior application, filed by me March 26, 1906, Serial No. 308,160; only so much of a hay loader being shown in the present case as will give a clear understanding of how the present invention is applied to the machine of said prior application.

Referring to the drawings, 1 designates as a whole the rear end portion of the main frame of the machine, the portion of said frame shown comprising upper main side frame members 2, auxiliary side frame members 3, obliquely disposed elevator side frame members 4 and 5, a cross frame member 6 secured to the under sides of the frame members 2 just in front of the main rotary rake, and cross shafts 7 and 8 extending axially through the pick-up head and through the rotary rake head, respectively. The rear part of the main frame is supported on a pair of casters 9 suitably connected with bracket castings 10, while the front end of the main frame is supported by supporting wheels not shown.

11 designates as a whole the rotary pick-up head, generally similar to that shown in my prior Patent No. 809598 of Jan. 9, 1906. This mechanism being journaled upon a pair of brackets 12 carried by the frame members 2 and comprising the shaft 7 journaled in and extending through said brackets, main sprockets 13 rigidly mounted upon the shaft 7 just inside of the respective brackets 12, cams 14 mounted upon and rigid with the respective brackets 12, and a series of cranked pick-up finger shafts 15, each of which is provided at each end with a crank extension 16 and cam roller 17 adapted to coöperate with the corresponding cam 14, all as fully set forth and described in said prior application. Each pick-up finger shaft carries a series of fingers, as 18, which extend rigidly therefrom and are approximately radial to the axes of their respective shafts.

Trained around the two main sprockets 13 are carrier chains 19 which carry the usual flights or slats 20, and these chains 19 are positively driven from another part of the carrier, not illustrated, in such manner as to rotate the pick-up head in a forwardly rolling direction.

Describing now the rotary rake mechanism, upon the cross shaft 8 are keyed or otherwise rigidly secured, adjacent to the respective ends thereof, a pair of star-shaped spiders or supports 21 and 22, respectively (see Figs. 3 and 4), each having four arms arranged in right angled relation. Through each pair of arms is arranged to extend a rake shaft 23 carrying a series of rake teeth 24; these rake teeth being journaled in the spider arms so as to oscillate, and each rake shaft being provided at one end with a segmental stop 24' to coöperate with a corresponding stop projection 25 upon the adjacent spider arm positively limiting the oscillatory movement of the rake shaft in each direction. Each rake shaft is provided at its opposite end with a crank, as 26, carrying a cam roller 27, and these cam rollers coöperate with a cam 28 which is fixedly mounted upon the frame bar 3 hereinbefore referred to. The acting portion of the periphery of the cam 28 is of peculiar configuration, comprising a portion 29 which is substantially concentric with the axis of the rake head and merges into another portion 30 somewhat spirally or eccentrically curved relatively to the axis, these two portions 29 and 30 forming the lower side of the cam. The shaft 8 extends through the upper part of the cam and the upper edge of the latter is out of range of the cam rollers. The length of the crank arms 26 and shape of the lower periphery of the cam 28 are such that during the rotation of the rake head, while each rake shaft travels from a position behind and about horizontally opposite the main shaft until it reaches a position approximately vertically below the main shaft, the rake teeth will be positively held in a position approximately radial to the main axis of the rake head and during the first half of their rising movement, or from the time the rake shafts are about vertically beneath the main shaft until they are horizontally in front of the latter, the rake shafts will be gradually oscillated backwardly relatively to the rotation of the rake head so as to present the rake teeth to the hay in an approximately vertical position during all of this part of the revolution. Just after the rake shafts pass above the horizontal plane of the main shaft the cam rollers thereof pass out of engagement with the cam, and thereupon the rake shafts may oscillate freely (within the limits permitted by the stop mechanism 24'—25) until their cam rollers again engage the cam during the descent of the rake shafts at the rear side of the head. At the time the rake shafts are thus set free from engagement with the controlling cam 28 the rake teeth have just finished their forward propelling or raking action and the hay has been brought within effective range of the pick-up fingers 18. It follows that the elevating action of the pick-up fingers is in no wise interfered with, but on the contrary the rake teeth 24 are controlled in their position by the movement of the hay and withdraw naturally and freely from the latter. This feature is of the utmost importance for the reason that it permits the pick-up fingers to act unrestrainedly upon the head and the latter is in no wise held or dragged back by the rake teeth. This construction enables me to dispense with a floating or analogous compressor frame overlying the elevator and floating upon the hay. Such compressor frames are seriously objectionable for at least two reasons, viz: They bear frictionally against the upwardly moving hay and thus add materially to the draft of the machine, and they tend to hold back the hay thus retarding its entrance to the elevator passage at the most critical point, viz: just where the raking and pick-up mechanism is operating and before the conveyer or elevator mechanism has fairly gained control of the hay. It will be noted that the confining frame (designated 33 in the drawings) is set a substantial distance away from the upper or active surface of the conveyer, the arrangement being such that the hay flows freely within the lower part of the conveyer passage.

I claim as my invention:

In a raking mechanism, the combination with a wheeled main frame, of a rotary rake head comprising a supporting frame bodily rotatable about a central axis, a plurality of rake shafts mounted to oscillate each about its own axis in said supporting frame and spaced apart angularly, said shafts being spaced an equal distance from the center of the central axis, a series of teeth on each rake shaft, a stationary cam mounted to extend substantially entirely below the horizontal axis of said supporting frame, an arm carried by each rake shaft, a wiper carried by each of said arms and adapted to engage said cam, that portion of the cam which engages the wipers in their downward travel being substantially concentric to the axis of the supporting frame, and that portion of the cam which engages the wipers in their upward movement being eccentric to the axis of said frame, said rake teeth extending radially with reference to the central axis when the cam wipers engage with the concentric part of the cam, and abutments on said supporting frame and shafts for positively limiting the oscillatory movement of said rake shafts in either direction and independently of said cam.

SAMUEL M. WIXCEL.

Witnesses:
 C. A. PATCH,
 S. F. WENTWORTH.

---

Copies of this patent may be obtained for five cents each, by addressing the "Commissioner of Patents, Washington, D. C."